Oct. 27, 1936.   S. KIESSKALT ET AL   2,059,116
PROCESS FOR PRODUCING FINE GRAINED PRECIPITATES
Filed Oct. 23, 1933

Patented Oct. 27, 1936

2,059,116

UNITED STATES PATENT OFFICE 2,059,116

PROCESS FOR PRODUCING FINE-GRAINED PRECIPITATES

Siegfried Kiesskalt, Albert Funke, and Karl Boedeker, Frankfort-on-the-Main-Hochst, Germany, assignors to I. G. Farbenindustrie Aktiengesellschaft, Frankfort-on-the-Main, Germany Application October 23, 1933, Serial No. 694,916
In Germany October 29, 1932

3 Claims. (Cl. 23—1)

The present invention relates to a process for producing fine-grained precipitates.

For many purposes, for instance for the manufacture of pharmaceutical preparations, dyestuffs or various kinds of other chemical products, it is essential to obtain in as fine-grained form as possible solid particles which are produced by precipitation.

We have now found a process of producing particularly fine-grained precipitates, which consists in the following: The liquids capable of producing a precipitate by reacting with each other are sprayed at the moment when they meet or directly after they have met, but before the action producing the precipitate is finished. The size of the precipitated particle which is formed within each little drop of spray is thus already limited by the size of the drop. During this procedure it is possible to enlarge or diminish—by an appropriate selection of the concentration of the liquids which act on one another—the mass of the solid body which is formed in each drop of spray. When using this method there often occurs a novel effect which could not be predicted. The electric charges which are produced during the operation of spraying through a nozzle may amount to several hundred volts; they electrify in the same sense the precipitating germs which are formed, so that within a drop the various germs do not unite with one another, but tend to be as far apart as possible. Consequently, there may be obtained still smaller particles than correspond with the size of the drops.

If the velocity of the precipitating reaction is so great that the reaction would be finished before the mixture could be centrifuged from the spraying device, it is advisable to decrease the velocity of the reaction by addition of an agent capable of retarding the reaction. If, however, the precipitating reaction occurs so slowly that it would not be completed after the drops of spray have united again in the collecting vessel, this drawback can be overcome by the addition of an agent that accelerates the reaction or by extending the route from the point where the components meet to the point where the drops of spray re-unite in the collecting vessel.

The spraying may, for instance, be conducted with application of pressure, with or without the aid of an indifferent compressed gas, in known spraying nozzles, care having to be taken that the various liquids which act on each other are mixed within the nozzle and stay there only for a short time.

Figure 1:
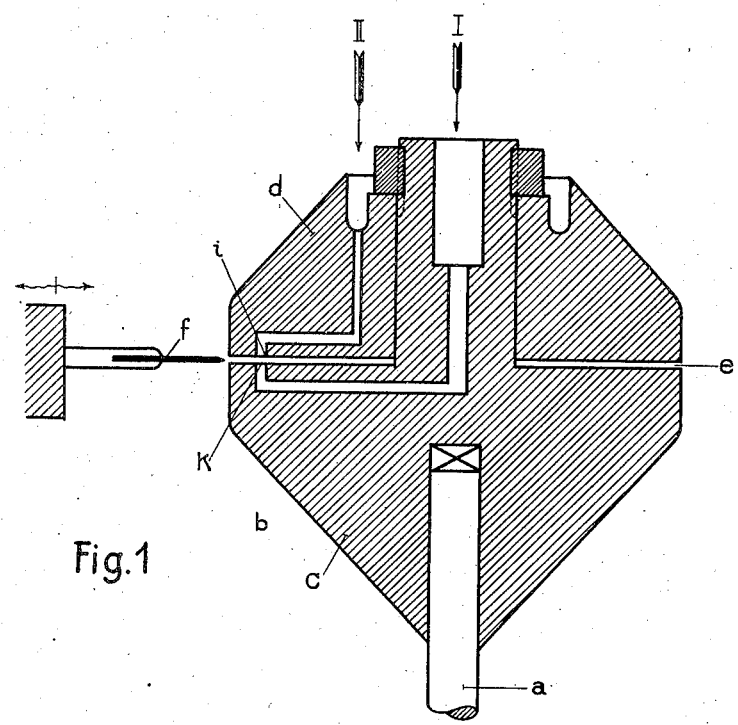
Figure 2:
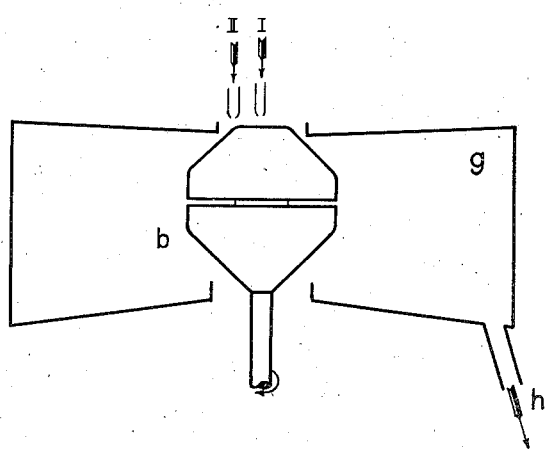

The invention includes a particular apparatus in which the invention can be applied continuously; Fig. 1 of the accompanying drawing is an axial section through this apparatus and Fig. 2 is an elevation of a like apparatus.

On a shaft $a$ rotating at a high number of revolutions there is fixed a spraying head $b$ consisting of two conical parts $c$ and $d$ for reception of two liquid components I and II. The component I runs in a dosed quantity into the central cavity in the cone $c$ and thence radially to the meeting place, while the component II runs in dosed quantity into the central cavity of cone $d$ and thence radially to the meeting place. The discharge openings $i$ and $k$ of the radial bores are near the circumference of the spraying head and are opposite to one another in the bases of the cones, this spot constituting the meeting place. The bases are parallel to one another and only a very small distance apart, so that they form a fine, adjustable, annular slit $e$. Within this slit the two components leaving the bores are mixed. Nearly at the moment when the liquids meet, the mixture is centrifuged with a pressure of several atmospheres by the centrifugal force and owing to the high speed of rotation the mixture is sprayed so as to form fine drops. A knife $f$ may be introduced from outside into the slit $e$ in order to remove any deposit which may clog the apparatus when at work.

Instead of one bore for each of the two liquid components, it is also possible to provide the rotating body with several bores the discharge openings of which are near the circumference of the rotating body and are opposite to one another, corresponding to the discharge openings $i$ and $k$ illustrated in Fig. 1 of the drawing. The various discharge openings in the bases of the cones may be connected with one another by an annular groove.

In a similar manner there may be shaped spraying heads consisting of three or more parts; the channels in these heads can be brought together in manner and succession adapted to the chemistry of each particular precipitating reaction.

The sprayed suspension may be allowed to fall into a spraying chamber, or the head $b$ may be surrounded by a collecting vessel $g$ provided with an outlet $h$, as illustrated in Fig. 2. The suspension continuously leaves the outlet and is then further worked up.

Instead of the afore described spraying head there may be used other spraying devices containing bores, tubes or similar means which are arranged in such a manner that the liquid components can run separately into the bores or the like and that the discharge openings of the bores are near one another and near the circumference of the spraying device so that the components meet nearly in the moment when they are centrifuged from the spraying device.

The process is distinguished from the known spray drying process by the fact that in the latter only the solvent is expelled and the already finished compound is merely mechanically influenced as to its granular size. The process of the present invention is a precipitating operation and prevents the production of coarse-grained precipitates at a moment when the pertinent action has not yet been finished.

The following examples serve to illustrate the invention, but they are not intended to limit it thereto:

(1) Naphthol suspension 5 liters of a solution of 1.44 per cent. strength of beta-naphthol and of 0.4 per cent. strength of alkali are caused to run simultaneously with 5 liters of hydrochloric acid of 0.5 per cent. strength separately into the inlet openings of an apparatus such as is described above, which is rotating with about 12000 revolutions per minute. The precipitated beta-naphthol, which is centrifuged from the slit having a width of 0.02 mm., is obtained in the form of very fine particles.

(2) Cc version of the sodium salt of a monoazo-dyestuff into the barium salt 88 grams of the dyestuff from diazotized 2-chloro-4-sulfo-5-amino-1-benzoic acid and beta-naphthol are dissolved in 3 liters of water and the solution is heated to 80° C. This solution is united in the manner and in the apparatus described above with a solution of 32 grams of barium chloride in 3 liters of water. The barium salt obtained is distinguished by a very fine distribution and uniformity of grain.

(3) Formation of dyestuff

A diazo-compound prepared in known manner from 76 grams of 3-nitro-4-toluidine is united in the apparatus described above with a solution of 92 grams of acetic acid anilide in the presence of sodium acetate. The yellow pigment produced is obtained in the form of very fine particles.

(4) Precipitation of barium sulfate

A solution of 10 per cent. strength of barium chloride is combined in the manner described in Example 1 with a solution of sodium sulfate. The particles of barium sulfate produced are so fine that they can be recognized only by the ultra-microscope. Their diameters are considerably below 0.2 $\mu$, whereas in a normal precipitation there are obtained particles of a diameter of 1–2 $\mu$.

We claim:

1. A process of producing fine-grained precipitates by a liquid phase reaction which comprises causing liquid components capable of producing a precipitate by reacting with each other to meet and spraying the resultant mixture of said liquid components at the moment when they meet so as to obtain fine drops of spray.

2. A process of producing fine-grained precipitates by a liquid phase reaction which comprises causing liquid components capable of producing a precipitate by reacting with each other to meet and spraying the resultant mixture of said liquid components directly after they have met, but before the precipitating action is finished, so as to obtain fine drops of spray.

3. A process of producing fine-grained precipitates by a liquid phase reaction which comprises adding to the liquid components capable of producing a precipitate by reacting with each other a substance capable of influencing the velocity of the precipitating action, causing the liquid components to meet and spraying the resultant mixture of said liquid components at the moment when they meet so as to obtain fine drops of spray.

SIEGFRIED KIESSKALT.
ALBERT FUNKE.
KARL BOEDEKER.